US007609598B2

(12) United States Patent
Nakatani

(10) Patent No.: US 7,609,598 B2
(45) Date of Patent: Oct. 27, 2009

(54) HYBRID OPTICAL DISC

(75) Inventor: Morio Nakatani, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 482 days.

(21) Appl. No.: 11/483,654

(22) Filed: Jul. 11, 2006

(65) Prior Publication Data

US 2007/0008871 A1 Jan. 11, 2007

(30) Foreign Application Priority Data

Jul. 11, 2005 (JP) ............................ 2005-201359
Mar. 28, 2006 (JP) ............................ 2006-086920

(51) Int. Cl.
*G11B 19/00* (2006.01)

(52) U.S. Cl. ............. 369/53.21; 369/59.25; 369/275.3; 386/95

(58) Field of Classification Search ............. 369/30.04, 369/53.21, 275.1, 275.3; 386/94
See application file for complete search history.

(56) References Cited

U.S. PATENT DOCUMENTS 6,141,483 A * 10/2000 Yamada et al. ................ 386/46
2005/0198115 A1* 9/2005 Sugimoto et al. ........... 709/203

FOREIGN PATENT DOCUMENTS

JP 2002216391 A * 8/2002
JP 2004-185724 7/2004

OTHER PUBLICATIONS

Machine translation of JP 2002-216391A into English, Suzuki.*

* cited by examiner

*Primary Examiner*—Wayne R Young
*Assistant Examiner*—Brian Butcher
(74) *Attorney, Agent, or Firm*—McDermott Will & Emery LLP

(57) ABSTRACT

Hybrid optical disc has a DVD layer and a HDDVD layer in a laminating direction. When regional assignments as shown in FIGS. 5A and 5B are applied to these layers, regional information in the DVD layer contains "1" in the bit position corresponding to Code 2 and Code 3, and the HDDVD layer contains "1" in the bit position corresponding to Code p, Code q, and Code r+1 through r+4. Thereby, any one of contents recorded in the two layers can be reproduced in Japan, Greenland, Korea, and Southeast Asia nations.

7 Claims, 6 Drawing Sheets

*FIG. 3*

|  |  | < NTSC method > | < PAL method > | < SECAM method > |
|---|---|---|---|---|
| Code | Region | Country | Country | Country |
| 0 | With no limitation | With no limitation | With no limitation | With no limitation |
| 1 | Area A | North America | ... | ... |
| 2 | Area B | Japan / Greenland | ... | ... |
| 3 | Area C | South Korea / Southeast Asia Nations | ... | ... |
| 4 | Area D | ... | ... | ... |
| 5 | Area E | ... | ... | ... |
| 6 | Area F | ... | ... | ... |
| 7 | Un-giving a definition | Un-giving a definition | Un-giving a definition | Un-giving a definition |
| 8 | Special use | Special use | Special use | Special use |

REGIONAL ASSIGNMENT OF DVD

Regional Assignment of DVD

Regional Assignment of HDDVD

Regional Assignment of HDDVD

Regional Assignment of DVD
Code 2
Code 3
Greenland
Japan
South Korea
Southeast Asia Nations Regional Assignment of HDDVD
Code p
Code q
Code r
Greenland
Japan
South Korea
Southeast Asia Nations Regional Assignment of HDDVD
Code r+1
Code r+2
Code r+3
Code r+4
Taiwan
Cambodia
Philippines
Myanmar

REPRODUCE BY HDDVD/DVD COMPATIBLE TYPE PLAYER

HYBRID OPTICAL DISC

This application claims priority under 35 U.S.C. Section 119 of Japanese Patent Application No. 2005-201359 filed Jul. 11, 2005 and Japanese Patent Application No. 2006-86920 filed Mar. 28, 2006.

BACKGROUND OF THE INVENTION

1. Field of the Invention

The present invention relates to hybrid optical disc in which multiple recording layers responsive to laser lights of different wavelengths are arranged in a laminating direction.

2. Description of the Related Art

Currently, Read-only type DVDs (Digital Versatile Disc) that uses a red laser light having the wavelength of 650 nm are produced on a commercial basis and are widely spread. This type of DVDs contains what is called “regional information” which defines regions where reproduction of that DVD is permitted.

The regional information is provided for the use in making arrangements between the timing of the theatrical opening of a movie and the timing of the circulation of a DVD in which the relevant movie is recorded. In general, a movie will open in theaters worldwide on various dates differing by country or region. Therefore, there is the necessity of preventing the reproduction of the DVD in such countries or regions that the circulation of the DVD precedes the theatrical opening of the movie, and to this end, the regional information is used to manage the authority of the reproduction of the relevant DVD for each country or region.

Regional code is incorporated in a DVD player in advance, and a DVD can be reproduced by the DVD player only when the regional information contained in that DVD conforms to regional codes in the relevant DVD player.

Japanese Laid-Open Publication No. 2004-185724 discloses that a player is equipped with an attachable and detachable local data holding means, and thereby, where that player is moved from one region corresponding to a certain regional code to another region, the player is still capable of reproducing DVDs in which the other region after the move is designated by the regional information in the DVDs.

Among all the optical discs currently placed on the market, only the DVD can contain the regional information, whereas the existing CDs (Compact Discs) are out of the scope for setting the regional information inside. Therefore, in the case of incorporating two layers of a CD layer and a DVD layer into one disc, in order to set the regional information, only contents retained in the DVD layer should be taken into account.

Recently, standardization is taking place as for the next generation DVD to which a blue laser light having the wavelength of 405 nm is used, and in the course of the standardization, it is reported that the inclusion of the regional information in the next generation DVD is being considered. Also consideration is made that two recording layers, one compliant with the next generation DVD format (hereinafter called HDDVD layer) and the other compliant with the DVD format (hereinafter called DVD layer), are arranged in a laminating direction. In this case, the regional information is to be inserted in both the HDDVD layer and DVD layer. To cope with this arrangement, one has to take into account, when setting the regional information to each layer, not only the contents retained in each layer per se but also the relationship between the contents and difference in format applied to each layer. When regional information is set up easily only in consideration of the contents of each layer, abnormality may be caused during the reproduction of the disc.

Now, it is determined that only one regional code can be set in the players capable of playing the next generation DVDs as well as DVDs, which is a restriction imposed to the players for the purpose of ensuring the security of the contents in the discs. It is one of the notable features of the DVD standard that the assignment of more than one regional code to a player is basically prohibited. Because of this, as described above, in the case of incorporating the two layers into one disc, one has to set the regional information for each layer while bearing in mind that only one regional information is settable in a player.

In case where only one set of regional information is embedded in the player, if the regional information retained in one recording layer (first recording layer) fails to match that in the other recording layer (second recording layer), a problem arises that only the contents retained in the first recording layer of the two can be reproduced in a region specified by the regional information retained in the first recording layer.

Specifically, assuming that the regional information in the HDDVD layer specifies Regions A and B, while that in the DVD layer specifies Region A, since a regional code of a player in Region B fails to match a region specified by the regional information in the DVD layer, the contents recorded in the DVD layer can not be reproduced in Region B. This will be problematic when contents information of the two recording layers is related to each other like that, for example, the contents information recorded in the DVD layer supplements with contents information recorded in the HDDVD layer. The region information of each layer must be set up carefully and proper so that the user of each country who uses a player may not be exposed to such inconvenience.

However, in standardization of next generation DVD, a new regional assignment different from what is specified by the DVD standard may be set up uniquely. If this happens, it becomes quite difficult to set up the regional information of each layer without inconvenience. Even if the respective regional information defines regions similar to each other, between these areas, the area which does not overlap each other occurs.

Specifically, in case that Region A is defined with respect to one certain region according to the regional assignment of the DVD standard while Region C is defined with respect to a combination of Region A1 which is part of Region A and Region B which is different from Region A according to the regional assignment of the HDDVD standard, assuming that the regional information specifying Region A and Region C is set in the DVD layer and the HDDVD layer, respectively, contents information in both the DVD layer and the HDDVD layer can be reproduced in Region A1, however, in Region B, contents information of the HDDVD layer can be reproduced while contents information of the DVD layer cannot be. Also, in this case, in an area falling outside of Region A1 within Region A, contents information of the DVD layer can be reproduced while contents information of the HDDVD layer cannot be. The larger the difference in the regional assignment according to the standard stipulated for the next generation DVDs becomes in comparison with that for the DVDs, the more significant such a problem becomes.

As clarified above, as long as the regional assignment according to the DVD standard is different from that in the next generation standard, there is a problem arising that setting the regional information properly in the DVD and HDDVD layers without causing any inconvenience to the user becomes extremely difficult, while restriction imposed to the player that only one region code can be set in the player participate in generating this problem.

SUMMARY OF THE INVENTION

The present invention aims to provide a hybrid optical disc that solves the above-mentioned problems, and that has capability of smoothly reproducing each contents recorded in the HDDVD and DVD layers in any countries or regions defined in the regional information.

A first aspect of the present invention relates to a hybrid optical disc; the hybrid optical disc including a plurality of recording layers responsive to laser lights having different wavelengths arranged in a laminating direction, wherein more than one set of contents information is recorded in the plurality of the recording layers responsive to each one of the wavelengths using a format according thereto; regional information for specifying regions allowed for reproducing the contents information is recorded in each one of the plurality of the recording layers in such a manner that the regions allowed for reproducing these contents information match each other.

A second aspect of the present invention relates to the hybrid optical disc according to the first aspect of the present invention, wherein the regional information recorded in each one of the plurality of the recording layers is set such that regions specified thereby match each other in respect of countries or regions employing the same video signal format.

A third aspect of the present invention relates to the hybrid optical disc according to the first or second aspect of the present invention, wherein when regional assignment for the regional information is different for each format, the regional information provided to each one of the contents information is set such that regions specified thereby match each other in a state where the number of regions allowed for reproducing the contents information is smallest.

A fourth aspect of the present invention relates to the hybrid optical disc according to the first or second aspect of the present invention, wherein in a case where a first region according to a first format is subdivided so as to define a region according to a second format, when the regional information according to the first format specifies the first region, all regions generated by subdividing the first region are specified by the regional information according to the second format.

A fifth aspect of the present invention relates to the hybrid optical disc according to the first or second aspect of the present invention, wherein in a case where part of a first region according to a first format is subdivided so as to define a region according to a second format, when the regional information according to the first format specifies the first region, at least all regions generated by subdividing the first region are specified by the regional information according to the second format.

A sixth aspect of the present invention relates to the hybrid optical disc according to the first or second aspect of the present invention, wherein in a case where part of a first region according to a first format and part of a second region according to the first format are combined so as to define a third region according to a second format, when the regional information according to the first format specifies the first region and the second region, at least the third region is specified by the regional information according to the second format.

"A first region" in the fourth aspect is embodied by a region consisting of Greenland and Japan specified by code 2 (as shown in FIG. 4A) in an embodiment described below. "A region according to a second format" in the fourth aspect is embodied by Greenland specified by code m and Japan specified by code n (as shown in FIG. 4B), or alternatively Greenland specified by code m, West Japan specified by code n and East Japan specified by code n+1 (as shown in FIG. 4C) in the embodiment described below.

"A first region" in the fifth aspect is embodied by a region consisting of Korea and Southeast Asia specified by code 3 (as shown in FIG. 5A). "A region according to a second format" in the fifth aspect is embodied by Taiwan, Cambodia, Philippine, and Myanmar specified by code r+1, r+2, r+3 and r+4, respectively (as shown in FIG. 5C) in the embodiment described below.

"A first region" in the sixth aspect is embodied by Greenland and Japan specified by the code 2 (as shown in FIG. 5A) in the embodiment described below. "A second region" in the sixth aspect is embodied by a region consisting of Korea and South Southeast Asia specified by the code 3 (as shown in FIG. 5A) in the embodiment described below. "A third region" in the sixth aspect is embodied by Japan and Korea specified by code q (as shown in FIG. 5B) in the embodiment described below.

"A first format" and "a second format" in the fourth thorough sixth aspects are embodied by formats compliant with the DVD standard and HDDVD standard respectively in the embodiment described below.

It should be noted that the embodiment described below is not intended to limit the technical scope of the present invention.

According to the present invention, since the regional information for each of the contents information is set in such a manner that reproduction allowable regions defined thereby corresponds each other, any contents information contained in the disc can properly be reproduced on a player in a region to which that disc is formally distributed.

If the contents information is video information, the regional information that included in each recording layer may be set, as in the second aspect, in such a manner that, regions specified by the regional information of each recording layer matches each other at least within a scope of countries or regions employing the same video signal format.

In this case, for example, the contents information according to NTSC format cannot be reproduced in the player according to PAL format, unless it is converted through the converter. Hence, reproduction of contents information should just be permitted in the countries or regions which adopt the same video format as that applied to the contents information, and accordingly, the regional information in the recording layers should be set such that regions defined thereby match each other in respect of countries or regions employing the same video signal format, as clarified in the second aspect. At least by doing so, any contents information contained in one disc can smoothly be reproduced in any countries or regions where reproduction of these contents information is originally intended.

By using the method, like the above, that reproduction allowable regions are matched each other within the countries or regions employing the same video signal format, a technical advantage can be attained that the matching of the regions authorized for reproducing is easily realized.

If adopting this method, when making the reproduction allowable regions matched each other while combining regions divided in accordance with different regional assignment for every recording layer, combining redundant regions in unnecessary large extent is avoidable. Therefore, the reproduction allowable regions can effectively be narrowed down to an extent.

It should be noted that in accordance with the present invention multiple contents can be reproduced from one disc without fail, and thereby, such an inconvenience can be eliminated that a user has to purchase a disc individually for every contents information. In addition, even if the regional assignment for each format is different from each other, any contents in a disc can be reproduced without fail, as long as a player used in a region to which the relevant disc is formally distributed. Therefore, a user can freely purchase the hybrid optical disc without worrying about the difference in the regional assignment for each format. Therefore, according to the present invention, the convenience of the user at the time of disc purchase can be improved.

On the side of suppliers, another advantage can be achieved on inventory management, since they do not need to prepare the disc of the variety to which the region information is set up individually for every destination. Also, such a redundant process can be eliminated that the disc supplier should supply the disc of the same contents to the same region again while providing region information according to other format, thus the efficiency of disc supply can be improved. Therefore, according to the present invention, for the disc supplier, disc management can be simplified and the burden of the cost is suppressed.

BRIEF DESCRIPTION OF THE DRAWINGS

These and other objects, and features in accordance with the present invention may be best understood by referring to the following description of the presently preferred embodiments together with the accompanying drawings, in which:

FIG. 3 shows a structure of regional information applied to a DVD layer in accordance with the embodiment of the present invention;

DETAILED DESCRIPTION OF THE PREFERRED EMBODIMENT

The embodiment of the present invention will now be described with reference to the drawings.

Figure 1:
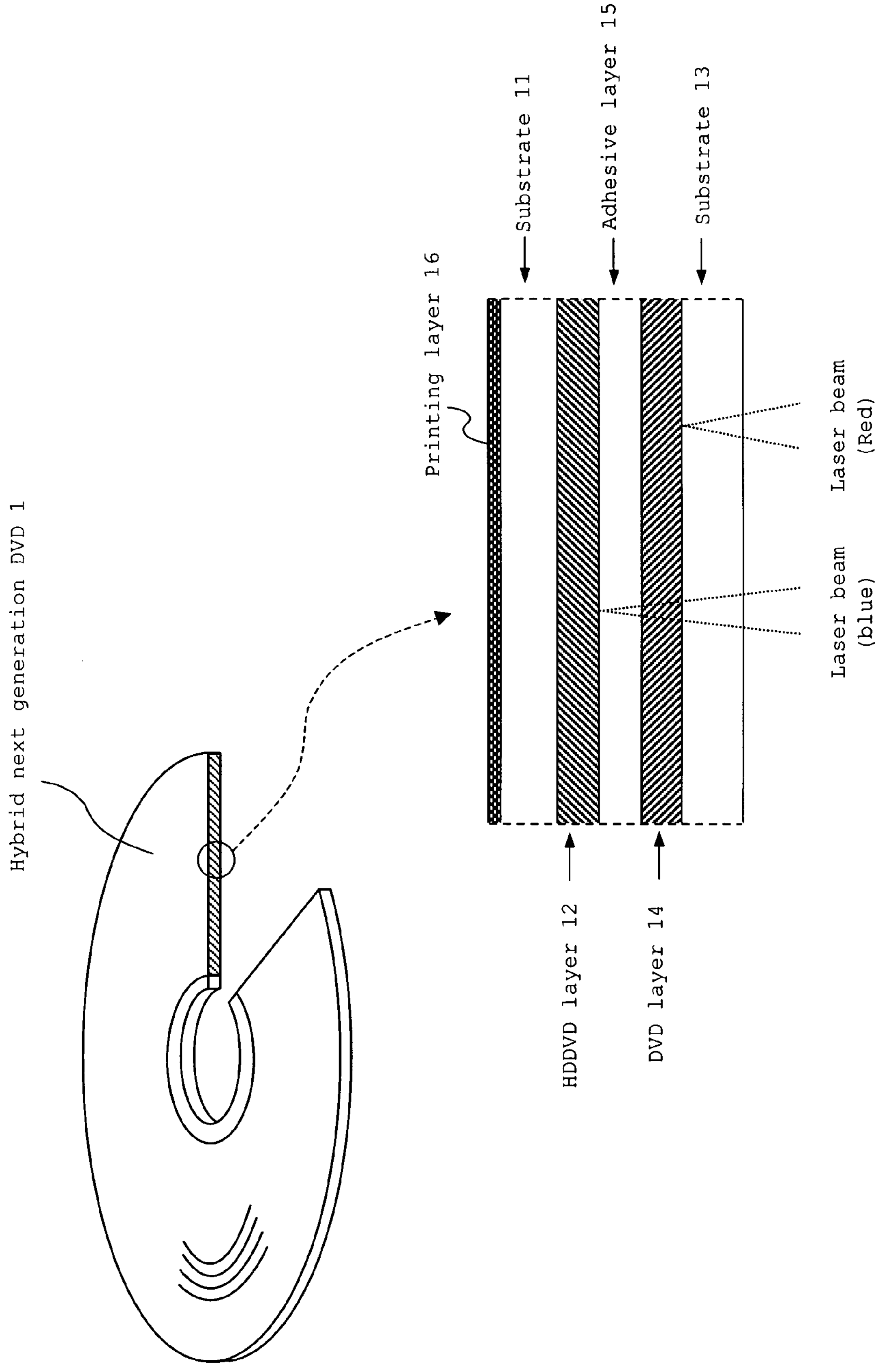
FIG. 1 shows a configuration of an optical disc in accordance with an embodiment of the present invention.

FIG. 1 shows a configuration of a Read-only type next generation DVD in which a DVD layer and a HDDVD layer are incorporated (hereinafter called "hybrid next generation DVD").

The hybrid next generation DVD 1 has a configuration in which a substrate 11 formed with the HDDVD layer 12 on one surface and a substrate 13 formed with the DVD layer 14 on one surface are laminated by an adhesive layer 15, and a printing layer 16 is formed on the other surface of the substrate 11. The laser light enters from the substrate 13 side. A series of pits are spirally formed in the HDDVD layer 12 and the DVD layer 14.

The data format of the DVD layer 14 compliant with the DVD standard. Note that lead-in information in the DVD layer 14 does not include any information indicating the presence of the HDDVD layer 12. The format of the HDDVD layer 12 is compliant with the next generation DVD standard.

Disc management information such as the lead-in information is retained in the DVD layer 14 and the HDDVD layer 12, respectively. That is, region information, one of the disc management information, which specifies regions where reproduction of contents information is allowed, is retained in DVD layer 14 and HDDVD layer 12.

Figure 2:
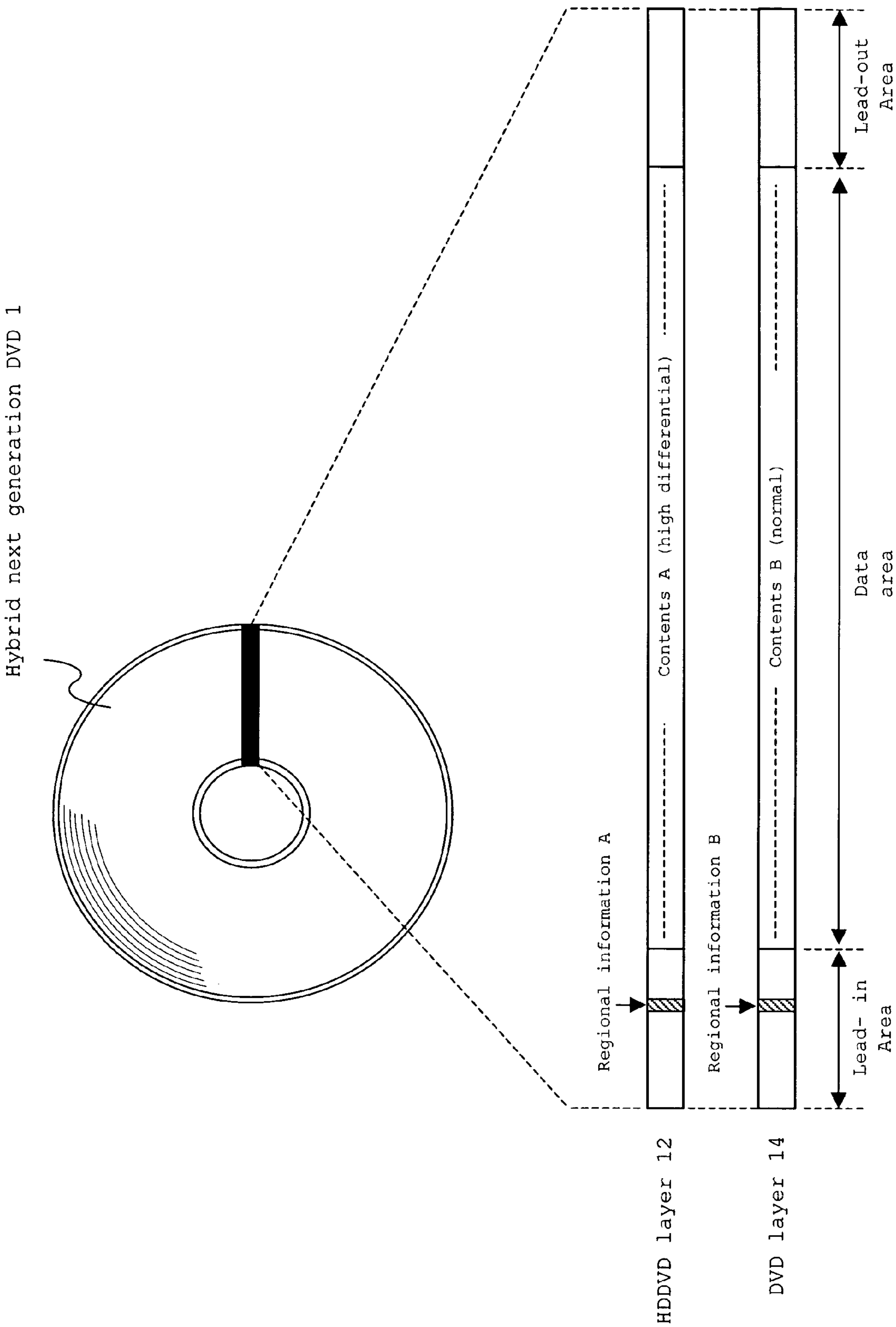
FIG. 2 shows an area format for the optical disc in accordance with the embodiment of the present invention.

FIG. 2 shows an area format for the hybrid next generation disc.

As shown in FIG. 2, both the HDDVD layer 12 and DVD layer 14 are divided into a lead-in area, a data area and a lead-out area sequentially from the disc inner circumference side, respectively. In the lead-in area, the regional information is retained as one of disc management information. As mentioned above, the regional information is for specifying certain regions where reproduction of contents information recorded on each recording layer is allowed.

In the data structure shown in FIG. 2, for example, the data area of the HDDVD layer 12 retains video contents (Contents A) of hi-vision mode, and the lead-in area thereof retains Regional Information A. The data area of the DVD layer 14 retains video contents (Contents B) of normal mode that serves as a supplement to Contents A in the HDDVD layer 12, and the lead-in area thereof retains Regional Information B. In this case, both the video contents are formed in same video signal formats (NTSC, PAL, etc.).

It should be noted that among the regions specified by the regional information in the respective recording layers, a country or region that corresponds to the same video signal format as that applied to the video contents in one recording layer matches that in another recording layer.

FIG. 3 shows an example of the regional information that is applied to the DVD layer 14.

As shown in FIG. 3, nine codes of code 0 through 8 are used as the regional information. Reproduction allowable region (Region A-F) is assigned to each code, respectively. Region A to F represents each region when the whole world is divided into six parts.

Several countries or regions where video signal formats differ mutually may be included in each of Region A-F. For example, Region A corresponding to Code 1 includes only countries or regions (North America) that employs NTSC, while Region B includes countries or regions (Japan and Greenland) that employ NTSC and countries or regions (EU and etc.) that employ PAL and SECAM.

The region information comprises 9-bit data corresponding to nine codes of code 0 through code 8. Whether or not the reproduction of a relevant disc is authorized in Region A to F is indicated by setting "1" or "0" in the bit position corresponding to each code. Specifically, if "1" is set in the bit positions corresponding to Codes 1 through 6, the reproduction of the relevant disc is allowed in Regions A to F corresponding to those codes. If "0" is set in the bit positions corresponding to Codes 1 through 6, the reproduction of the relevant disc is prohibited in Regions A to F corresponding to those codes. If "1" is set in the bit position corresponding to Code 0, the reproduction is authorized in any region of the world.

The regional information for the HDDVD layer 12 is also configured in the same manner as shown in FIG. 3. However, the regional assignment applied to the regional information for the HDDVD layer 12 is assumed to be different from that for the DVD layer 14, as described below.

EXAMPLE 1

Figure 4A:
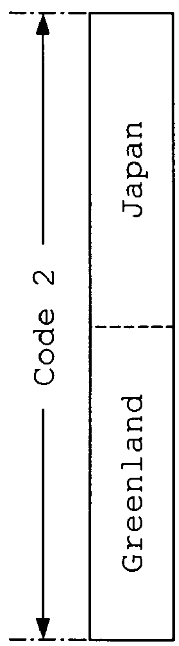
FIGS. 4A, 4B and 4C show examples of regional assignments for a HDDVD in comparison with that for a DVD in accordance with the embodiment of the present invention.
Figure 4B:
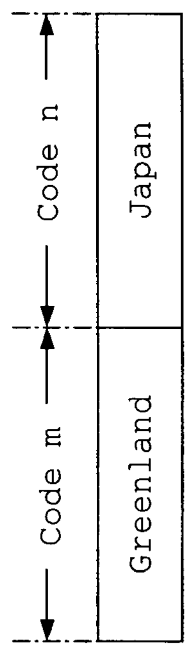
Figure 4C:
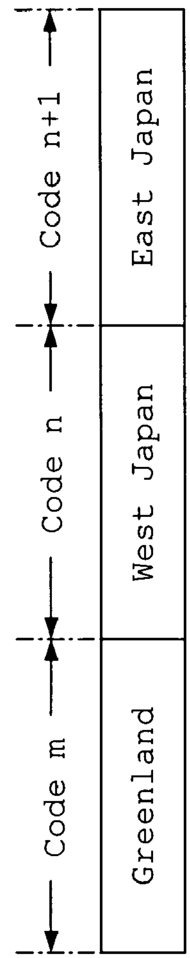

FIGS. 4A through 4C show correspondence between the regional codes and regions assigned therewith in a case where the regional assignment in FIG. 3 is further broken down and is applied to the HDDVD layer. In the examples of FIGS. 4A through 4C, only countries or regions employing NTSC are indicated, of all countries or regions assigned.

FIG. 4B presents an example showing that Greenland and Japan that are assigned with Code 2 in the DVD layer 14 are assigned with Code m and Code n, respectively, in the HDDVD layer 12 according to dividing the region for DVD shown in FIG. 4A.

FIG. 4C presents an example showing that the regional assignment in FIG. 4B is further broken down, and as a result Japan is divided into two smaller regions West Japan and East Japan, to which Code n and Code n+1 are assigned, respectively.

In the present embodiment, as mentioned above, the regional information in the HDDVD layer 12 and DVD layer 14 are configured such that, among the regions specified by the regional information in the respective recording layers, a country or region that employs the same video signal format as that applied to the video contents in one recording layer matches that in another recording layer.

Specifically, when the regional assignment in the HDDVD layer is that shown in FIG. 4B, the regional information in the DVD layer has "1" only in the bit position corresponding to Code 2, whereas the regional information in the HDDVD layer has "1" only in the bit position corresponding to Code m and Code n. In this case, contents information in each recording layer is according to NTSC. Thereby, both contents information recorded in the HDDVD layer and DVD layer can be reproduced in Japan and Greenland that employ NTSC.

Likewise, if the regional assignment in the HDDVD layer 12 is that shown in FIG. 4C, the regional information in the DVD layer has "1" in the bit position corresponding to Code 2, whereas the regional information in the HDDVD layer has "1" in the bit position corresponding to Code m, Code n and Code n+l, respectively. In this case as well, contents information in each recording layer is according to NTSC. Thereby, both contents information recorded in the HDDVD layer 12 and DVD layer 14 can be reproduced in Japan and Greenland that employ NTSC.

As clarified in the present embodiment, the regional information can be set in each recording layer in such a manner that regions allowed to reproduce the DVD layer are same as those allowed to reproduce the HDDVD layer. With this arrangement, such an inconvenience can be eliminated that contents information can be reproduced from only one of the layers in certain regions.

In the present embodiment, the regional code according to narrower regional assignment is set as following to the region defined by the regional code according to broader regional assignment (where the number of variations of region to be set is smaller) . In this case, disc suppliers should just supply the hybrid next generation DVDs of the same kind while dealing the regions specified by the regional code according to the broader regional assignment as the destination region, which makes it easier for the disc suppliers to engage in the inventory management. Also, the disc supplier does not need to supply the disc of the same contents to the same region again while providing region information according to other format, thus the disc supplier can supply the disc effectively and the burden of the cost in the disc supplier is suppressed.

Further, within the regions to be the destination region, contents can be reproduced from both the recording layers without fail. Accordingly, a user in this region can purchase hybrid next generation DVD freely, without being conscious of the region code for DVD layers and the region code for HDDVD layers being different. Therefore, the convenience of the user at the time of disc purchase is improved.

EXAMPLE 2

Figures 5A, 5B, 5C:
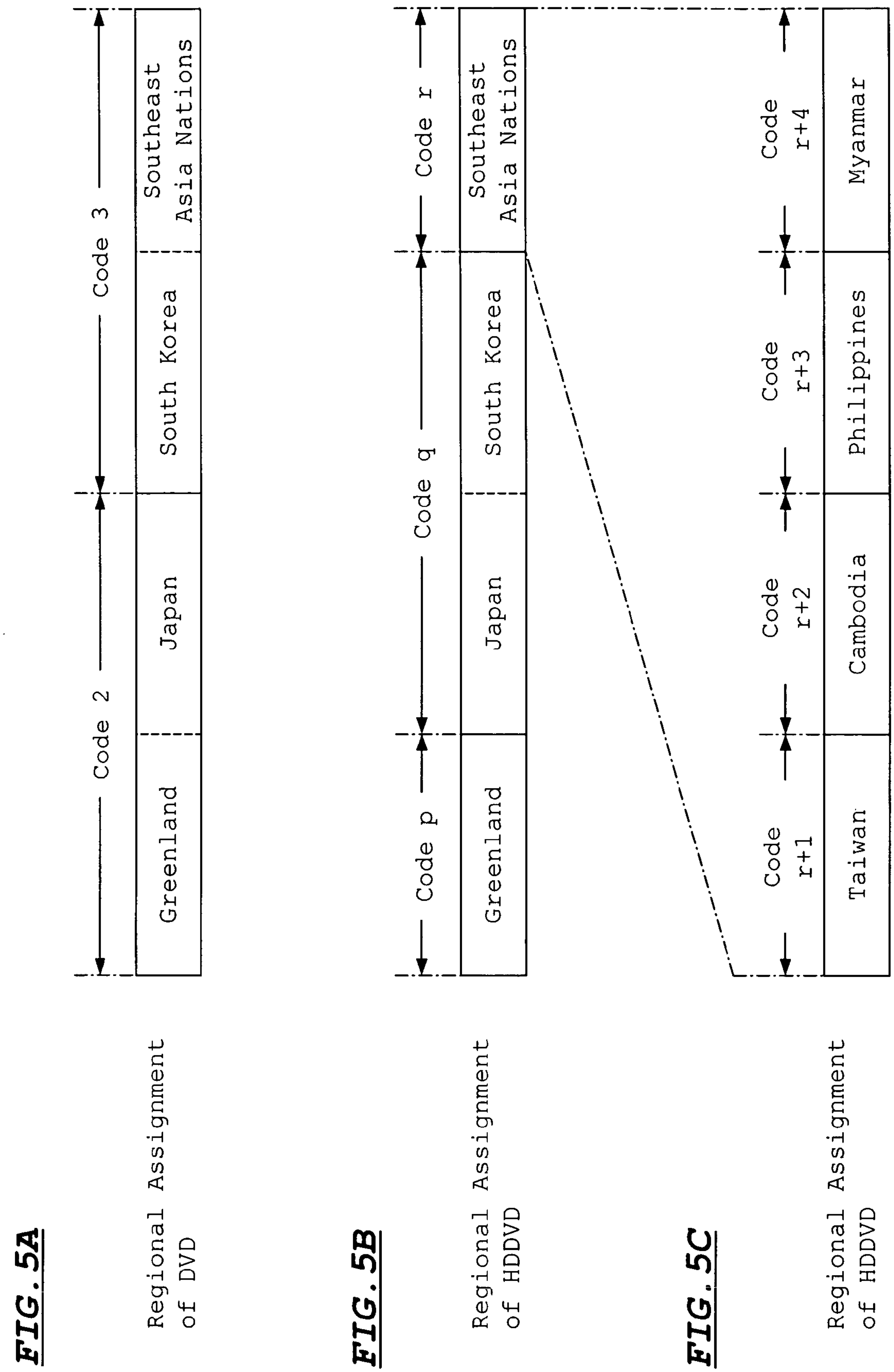
FIGS. 5A, 5B, and 5C show other examples of regional assignments for the HDDVD in comparison with that for the DVD in accordance with the embodiment of the present invention.

FIGS. 5A through 5C show correspondence between the regional codes and regions assigned therewith in a case where the boundaries of the regional assignment shown in FIG. 3 are modified and the regional assignment using the new boundaries is applied to the HDDVD layer. In the example of FIGS. 5A through 5C, only countries or regions employing NTSC are indicated, of all countries or regions assigned with each code.

FIG. 5B presents an example where Japan and Korea that are assigned with Code 2 and Code 3, respectively, in the DVD layer 14 are combined and assigned with Code q in the HDDVD layer 12.

FIG. 5C presents an example where Southeast Asia in FIG. 5B is further broken down into four countries, Taiwan, Cambodia, Philippine, and Myanmar, each assigned with Code r+1 through r+4, respectively.

When the regional assignment in the HDDVD layer 12 is as shown in FIG. 5B, the regional information in the DVD layer has "1" only in the bit position corresponding to Code 2 and Code 3, whereas the regional information in the HDDVD layer has "1" only in the bit position corresponding to Code p, Code q, and Code r. In this case, contents information in each recording layer is according to NTSC. Thereby, both contents information in the HDDVD layer 12 and DVD layer 14 can be reproduced in Japan, Greenland as well as Korea and Southeast Asia nations employing NTSC.

Likewise, when the regional assignment in the HDDVD layer 12 is as shown in FIG. 5C, the regional information in the DVD layer has "1" only in data bits corresponding to Code 2 and Code 3, whereas the regional information in the HDDVD layer has "1" only in the bit position corresponding to Code p, Code q, Code r+1 through r+4. In this case as well, contents information in each recording layer is according to NTSC. Thereby, both contents information recorded in the HDDVD layer 12 and DVD layer 14 can be reproduced in Japan, Greenland as well as Korea and Southeast Asia nations employing NTSC.

As clarified above, in the present embodiment, even if the boundaries of the regional assignment for the HDDVD layer are defined to be different from those for the present DVD layer, the regional information is set in each one of the recording layer in such a manner that regions allowed to reproduce the DVD layer are same as those allowed to reproduce the HDDVD layer. Thereby, such an inconvenience that contents information can be reproduced from only one of the two recording layers can be eliminated.

The same advantages can be achieved as those when the example 1 above is followed: ease of inventory management as well as cost reduction is attained on the side of disc suppliers, and furthermore, convenience in purchasing a disc can be increased on the side of users.

Figure 6:
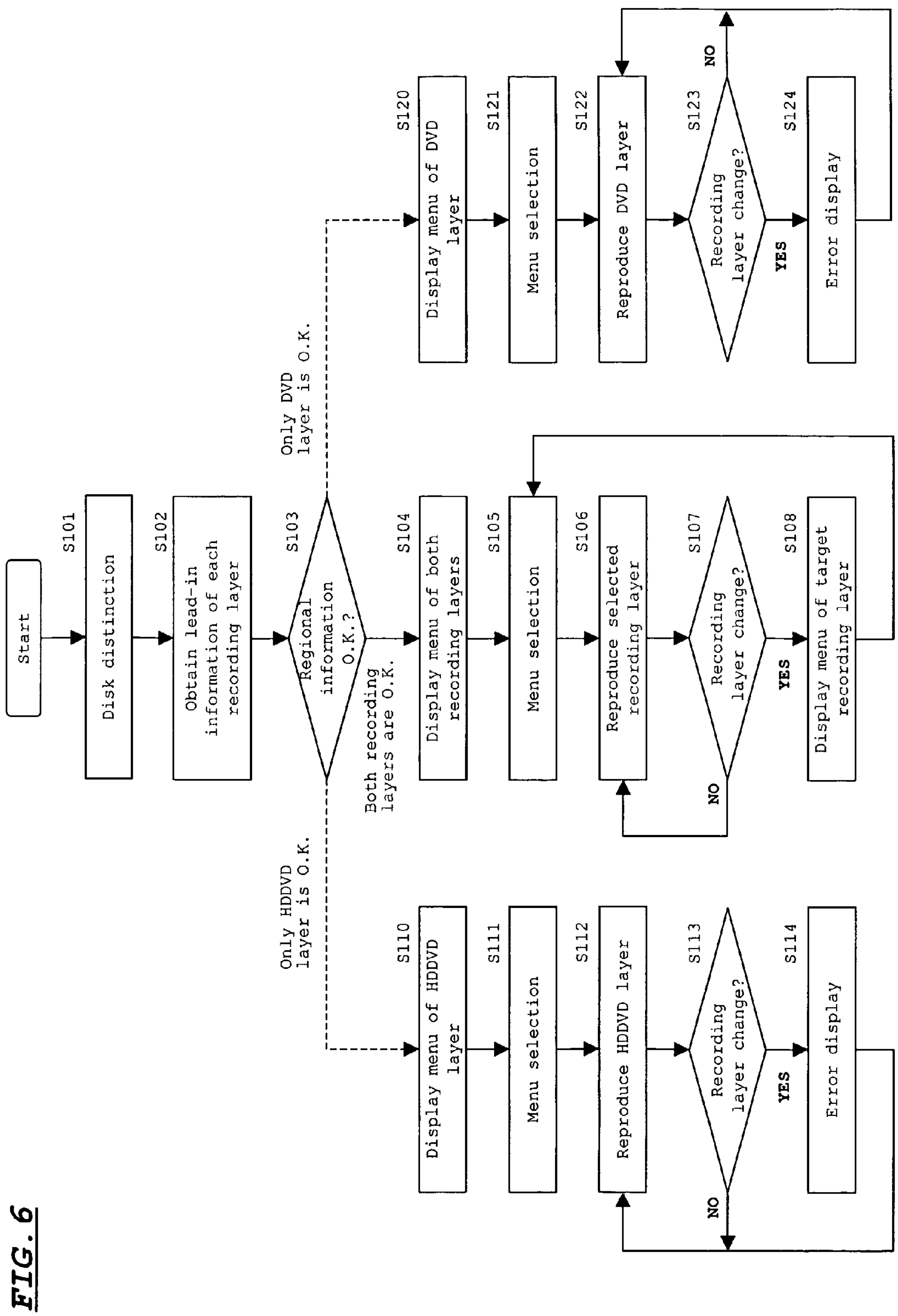
FIG. 6 shows an example of a basic operational flow for disc playback in accordance with the embodiment of the present invention.

Now, reference is made to FIG. 6, illustrating an example of a basic operational flow when the hybrid next generation disc is loaded into a player capable of handling it.

When the disc is loaded in the player, a disc distinction process is executed (S101) . The disc distinction is executed, for example, as follows. By irradiating a red laser light and a blue laser light in order to the relevant disc, whether focus draw-in operation and a read operation to each layer can be performed is detected. Based on a result obtained thereby, the number of the DVD layers and HDDVD layers within the disc is detected.

As a result, if the relevant disc is distincted to be a hybrid next generation DVD, lead-in information is read out from each recording layer, and is stored in a memory (S102). After that, regional information in the lead-in information is referenced, and thereby it is determined whether or not regions allowed to reproduce the disc correspond to regional codes provided to the player (S103).

Then if such correspondence is confirmed for each recording layer, a menu screen according to each contents information recorded in the HDDVD and DVD layers is displayed (S104). When a user enters a command for selecting any one of the contents information (S105), reproducing of a recording layer selected is commenced (S106). Such reproducing is continued until another command is inputted by the user so as to switch a recording layer to be reproduced (S107). In response to the entry of the switching command, contents menu for the recording layer to be switched over is displayed (S108). When the user selects a menu of his or her choice on the displayed menu screen (S105), reproducing of the recording layer to be switched over in accordance with the selection is commenced.

In S103, when the correspondence is confirmed on only regions defined by the regional information in the HDDVD layer, a menu screen only for the contents information recorded in the HDDVD layer 12 is displayed (S110). When the user selects an item from the menu (S111), reproducing of the HDDVD layer 12 is commenced in accordance with the selection (S112). In the course of reproducing, even if the command for switching a recording layer to be reproduced is input from the user (S113:YES), reproducing of the DVD layer 14 is not commenced since the DVD layer 14 is not authorized to be reproduced. In this case, an error message is overlapped on the existing display (S114), and the reproducing of the HDDVD layer is continued (S112).

In S103, when the correspondence is confirmed on only regions defined by the regional information in the DVD layer, a menu screen for the contents information recorded in the DVD layer is displayed (S120). When the user selects an item from the menu (S121), reproducing of the DVD layer 12 in accordance with the selection is commenced (S122). In the course of reproducing, even if the command for switching a recording layer to be reproduced is input from the user (S123: YES), since the HDDVD layer 12 is not authorized to be reproduced, reproducing of the HDDVD layer 12 is not commenced. In this case, an error message overlapped on the existing display (S124), and the reproducing of the DVD layer is continued (S122).

In a case where the hybrid next generation DVD in accordance with the present embodiment is loaded in the player, since regions defined by the regional information in the HDDVD layer 12 matches with regions defined by the regional information in DVD layer 14 within a scope in that the same video signal format is employed, when the hybrid next generation is used in any region for which the match is confirmed, the process flow from S103 to S104 is followed without fail.

Specifically, when the regional information is set as described above according to the regional assignment shown in FIGS. 4A through 4C, the process proceeds from S103 to S104 if the disc is used in any of Japan and Greenland, and therewith both contents information recorded in the HDDVD layer 12 and DVD layer 14 can be reproduced. Likewise, when the regional information is set as described above according to the regional assignment shown in FIGS. 5A through 5C, the process proceeds from S103 to S104, if the disc is used in any of Japan, Greenland, Korea and one of Southeast Asia nations, and therewith both contents information recorded in the HDDVD layer 12 and DVD layer 14 can be reproduced.

The foregoing description is provided for explaining the embodiment pertinent to the present invention. However, the present invention is not limited to the above embodiment, and various modifications can be made thereto.

For example, although the above embodiment explains the hybrid type disc having one HDDVD layer and one DVD layer, the present invention can be applied to a hybrid type disc having multiple recording layers, not restricted to a HDDVD layer and a DVD layer, responsive to laser lights of different wavelengths arranged therein.

Although the above examples are explained while dealing with the DVD standard and HDDVD standard in particular, an applicable standard is not limited to these, and for example, the blue-ray standard is also applicable instead of the HDDVD standard. Further, a configuration of the disc is not limited to one shown in FIG. 1, additional layers compliant with other standards are arranged on the laser entering side. In other words, the present invention is applicable to any configurations as long as a disc includes multiple layers that are compliant with two different standards or more, and the regional codes are provided to each layer according to different standards. The disc in accordance with the present invention should have at least two kinds of regional codes in multiple recording layers compliant to standards.

Moreover, the number of recording layers responsive to each wavelength is not limited to one, and two or more layers responsive to each wavelength may be provided. In this case, the regional information is provided for each contents information. Specifically, in a case where one DVD layer and two HDDVD layers are provided, and one set of contents information is retained through the two HDDVD layers, one set of the regional information is provided in the DVD layer and HDDVD layer, respectively. In another case where one DVD layer and two HDDVD layers are provided, and one set of the contents information is retained in each one of the HDDVD layers, one set of the regional information is provided in the DVD layer, and first and second HDDVD layers, respectively.

In the above embodiment, of all the countries or regions specified by the regional information, match is confirmed on countries or regions in respect of a video signal format employed. It is also feasible that the match is confirmed on all the countries or regions specified by the regional information. This method is effective if the kind of contents recorded in each layer is not video but audio, for example.

The above example defines the regional information as one kind of the management information for the lead-in area. However, the regional information may also be included in the data area as one kind of encryption codes for encoding data. The regional information may be included in the DVD layer and HDDVD layer in a different manner. One example for this is that the regional information is included in the HDDVD layer using bits responsible for the regional information within the lead-in information, while the regional information is included in the DVD layer with a method that the tail of the encryption codes for encrypting data is based on the regional information.

According to the DVD standard, the regional information can be included in control data zone (disc management area) of the lead-in area, part of header information of address information within the data area, or file management information (video information management table). On top of these, part of an encryption key and other can also be used for the regional code, and accordingly, the regional codes can be included in various areas within the data format.

In a case where several kinds of the regional information can be set within an optical disc, by setting each regional information in such a manner that reproduction allowable regions defined thereby are matching each other according to the present invention, reproduction of every contents information is made possible in the relevant regions. According to the present invention, it is avoided that an optical disc, part of which can be reproduced while the remaining part of which cannot be because the regional information therein totally different from each other, is distributed on the market. Therefore, of course, the advantage that such inconvenience does not arise for a user is obtained, in addition, there is another advantage brought to contents suppliers that regarding the setting of the regional information, a certain rule can be established and commonly used among them.

Apart from the foregoing description, various modifications can further be made without departing from the scope of the technical idea described in the appended claims.

What is claimed is:

1. A hybrid optical disc comprising:

a plurality of recording layers arranged in a laminating direction, including a first layer and a second layer responsive to a first laser light and a second laser light, respectively, the first and second laser lights having different wavelengths;

more than one set of contents information recorded in the first and second recording layers using a first format and a second format, respectively;

first regional information, recorded in the first recording layer, for specifying regions allowed for reproducing the contents information recorded in the first recording layer, from regions divided by first regional assignment for the first format; and second regional information, recorded in the second layer, for specifying regions allowed for reproducing the contents information recorded in the second recording layer, from regions divided by second regional assignment for the second format, wherein the first regional assignment is different from second regional assignment, and the regions allowed for reproducing the contents information recorded in the first layer match the regions allowed for reproducing the contents information recorded in the second layer.

2. The hybrid optical disc according to claim 1, wherein the first regional information and the second regional information are set such that regions specified thereby match each other in respect of countries or regions employing the same video signal format.

3. The hybrid optical disc according to one of claims 1 and 2, wherein the first regional information and the second regional information are set such that the number of regions allowed for reproducing the contents information is smallest.

4. The hybrid optical disc according to one of claims 1 and 2, wherein when one of the regions divided by the first regional assignment includes two or more regions divided by the second regional assignment, and when the first regional information specifies the one of the regions, all of the two or more regions divided by the second regional assignment are specified by the second regional information.

5. The hybrid optical disc according to one of claims 1 and 2, wherein when part of one of the regions divided by the first regional assignment includes two or more regions divided by the second regional assignment, and when the first regional information specifies the one of the regions at least all of the two or more regions divided by the second regional assignment are specified by the second regional information.

6. The hybrid optical disc according to one of claims 1 and 2, wherein when a part of a first region divided by the first regional assignment and a part of a second region divided by the first regional assignment correspond to a third region divided by the second regional assignment, and when the first regional information specifies the first region and the second region, at least the third region is specified by the second regional information.

7. The hybrid optical disc according to one of claims 1 and 2, wherein a format of the first recording layer for the first regional information is different from a format of the second recording layer for the second regional information.

* * * * *